United States Patent [19]
Seagle

[11] Patent Number: 6,019,817
[45] Date of Patent: Feb. 1, 2000

[54] SYSTEM AND METHOD FOR CAPTURING AND DESTROYING HAP/VOC SUBSTANCES USING MICROBIAL DEGRADATION

[75] Inventor: Edward D. Seagle, Andrews, N.C.

[73] Assignee: Agri Microbe Sales, L.C., Chester, Va.

[21] Appl. No.: 09/030,088

[22] Filed: Feb. 25, 1998

[51] Int. Cl.[7] .............................. B01D 53/02; C02F 3/10
[52] U.S. Cl. ................................ 95/143; 95/211; 95/237; 96/135; 96/153; 96/278; 96/296; 210/616; 210/150
[58] Field of Search ........................... 210/603, 615–617, 210/610, 611, 150, 151; 95/92, 94, 141–147, 211, 213, 224, 237–240, 274, 901, 902; 96/135, 153, 154, 276–280, 296, 297, 299

[56] References Cited

U.S. PATENT DOCUMENTS

| | | | |
|---|---|---|---|
| 3,936,281 | 2/1976 | Kurmeier | 95/211 |
| 4,073,686 | 2/1978 | Adams | 95/213 |
| 4,857,198 | 8/1989 | Meidl | 95/92 |
| 4,869,824 | 9/1989 | Melin et al. | 95/213 |
| 5,085,766 | 2/1992 | Born | 96/154 |
| 5,122,166 | 6/1992 | Hyrcyk et al. | 95/141 |
| 5,389,248 | 2/1995 | Pare et al. | 95/274 |
| 5,413,714 | 5/1995 | DeFilippi et al. | 95/211 |
| 5,490,941 | 2/1996 | Miyabe et al. | 95/142 |

*Primary Examiner*—Thomas G. Wyse
*Attorney, Agent, or Firm*—Reed Smith Hazel & Thomas LLP

[57] ABSTRACT

A system for capturing HAPs/VOCs from an existing or planned air stream and destroying the contaminants in the air stream by microbial degradation is disclosed. In general, the system is composed of a reservoir with a filter structure positioned above it. The filter structure contains a capture or filtration media through which contaminated air or vapors must pass. HAPs/VOCs in the air or vapors are filtered out and absorbed by the capture media. The reservoir contains a tank water bath that is inoculated with microorganisms that are selected to degrade the hazardous materials or pollutants removed by the capture media. Sprinkler heads above the filter structure spray the filter structure with a sprayed water bath also inoculated with the microorganisms, whereby contaminants caught in the filter structure are leached out and bioremediated.

13 Claims, 3 Drawing Sheets

SYSTEM AND METHOD FOR CAPTURING AND DESTROYING HAP/VOC SUBSTANCES USING MICROBIAL DEGRADATION

BACKGROUND OF THE INVENTION

1. Field of the Invention

The present invention relates to a system and method for capturing hazardous air pollutants (HAPs) and/or volatile organic compounds (VOCs), and then using naturally occurring micro-organisms to degrade those substances into non-hazardous byproducts, such as carbon dioxide and water.

2. Description of the Prior Art

Currently, various industries and manufacturing operations utilize processes that use and/or produce large volumes of HAPs and VOCs that typically end up as hazardous wastes that are released into the environment or stored in hazardous waste sites. Often, in order to comply with state and federal environmental regulations, some industries must either invest in the implementation of waste destroying/recycling equipment, pay for others to remove, destroy or recycle the hazardous wastes they produce, or pay considerable sums in fines or compensation fees for as long as they are producing those hazardous waste materials.

Some industries, such as the furniture manufacturing industry, by the very nature of the products or services they provide, cannot simply eliminate these hazardous waste producing processes or even find effective substitutes for such processes. For example, manufacturers of finished wood furniture use large quantities of varnishes, lacquers and other finishing substances that are petroleum hydrocarbon-based. These substances are often applied to furniture using large spray booths, wherein the excess of those substances are vapors that are simply ventilated out to the atmosphere using blowers. As one of skill in the art may note, only a fraction of the finishing substances sprayed onto the furniture in a spray booth actually remain on the furniture. Rather, a large percentage of those substances are eliminated as waste products. Alternatively, the application of materials as sprays in spray booths or other similar operations may result in the release of large quantities of propellants, additives, by-products and other substances in vapor form into the atmosphere. As a consequence, in the context of this example, not only can an industry be forced to comply or compensate for state and federal requirements are great cost, but also that industry can be producing large volumes of hazardous waste products without any potential for recovery or recycling of those waste products.

Therefore, there exists a need in the industry for a system that will effectively recover and recycle hazardous materials released into the atmosphere in vapor form, such as varnishes, lacquers and other finishing substances that are petroleum hydrocarbon-based, in order to avoid the unnecessary waste of those materials and the unneeded expulsion of HAPs/VOCs into the atmosphere.

There exists a further need in the industry for a system that will cost effectively recover and recycle hazardous materials, and that will satisfy federal and state requirements for preventing the expulsion of HAPs/VOCs into the atmosphere.

SUMMARY OF THE INVENTION

It is therefore an object of the present invention to provide a system that will effectively recover and recycle biodegradable, hazardous materials released into the atmosphere in vapor form, such as varnishes, lacquers and other finishing substances that are petroleum hydrocarbon-based, in order to avoid the unnecessary waste of those materials and the unneeded expulsion of HAPs/VOCs into the atmosphere.

A further object of the present invention is to provide a system that will cost effectively recover and recycle biodegradable, hazardous materials, and that will satisfy federal and state requirements for preventing the expulsion of HAPs/VOCs into the atmosphere.

In general, the present invention is directed to an apparatus and method for capturing HAPs/VOCs from an existing or planned air stream and destroying the pollutants in the air stream by microbial degradation or bioremediation. In at least one embodiment, the present invention is composed of a reservoir that contains a water bath inoculated with microorganisms that are selected to degrade hazardous materials or pollutants. A filter structure positioned above the reservoir contains a capture or filtration media through which contaminated air or vapors must pass. HAPs/VOCs in the air or vapors are filtered out and absorbed by the capture media. A second water bath that is also inoculated with the microorganisms is sprayed over the filter structure, whereby contaminants caught in the filter structure are leached out by the second water bath, and then dropped into the first water bath. The combination of the filter structure with the first and second water baths effectively bioremediates the contaminants in the air stream.

An even further object of the present invention is to provide a system that removes HAPs/VOCs from an air or other gaseous stream using microbial degradation in conjunction with removing and processing natural elements from the air stream for re-use.

In at least a first aspect, the present invention is directed to a system for recovering and recycling HAPs/VOCs from an air stream using bioremediation. The system for recovering and recycling HAPs/VOCs from an air stream using bioremediation incorporates a reservoir having a lower tank portion in which a first water bath is maintained, a filter structure containing a capture material therein, the filter structure being fixedly mounted over a top portion of the reservoir, and means for spraying a second water bath over the filter structure. The first and second water baths are composed of microbe-inoculated volumes of water that are inoculated with a predetermined type of microorganisms having an affinity for the HAPs/VOCs to be processed. The reservoir, the filter structure and the spraying means are positioned relative to one another whereby a contaminated air stream will flow into the reservoir for reaction with the first water bath in the lower tank portion and through the filter structure for filtering of contaminants therein, and whereby the second water bath sprayed from the spraying means will flow through the filter structure for reaction with the contaminants caught in the filter structure and then to the reservoir.

In a second aspect, the invention is directed to method for recovering and recycling HAPs/VOCs from an air stream using bioremediation. The method includes the steps of providing a filter structure containing a capture material therein, providing a first microbe-inoculated water bath so as to position the filter structure over the first water bath, inputting an HAP/VOC-contaminated air stream into the reservoir, whereby HAPs/VOCs are initially leached into the first microbe-inoculated water bath and thereby bioremediated therewith, filtering remaining HAPs/VOCs in the air stream through the filter structure, and spraying the filter structure with a second microbe-inoculated water bath so as to further leach the HAPs/VOCs out of the filter structure and into the second water bath. The second water bath will flow through the filter structure and into the first water bath, thereby further bioremediating the remaining HAPs/VOCs.

BRIEF DESCRIPTION OF THE DRAWINGS

The invention will be further described in conjunction with the accompanying drawings in which.

DETAILED DESCRIPTION OF THE PREFERRED EMBODIMENT

Figure 1:
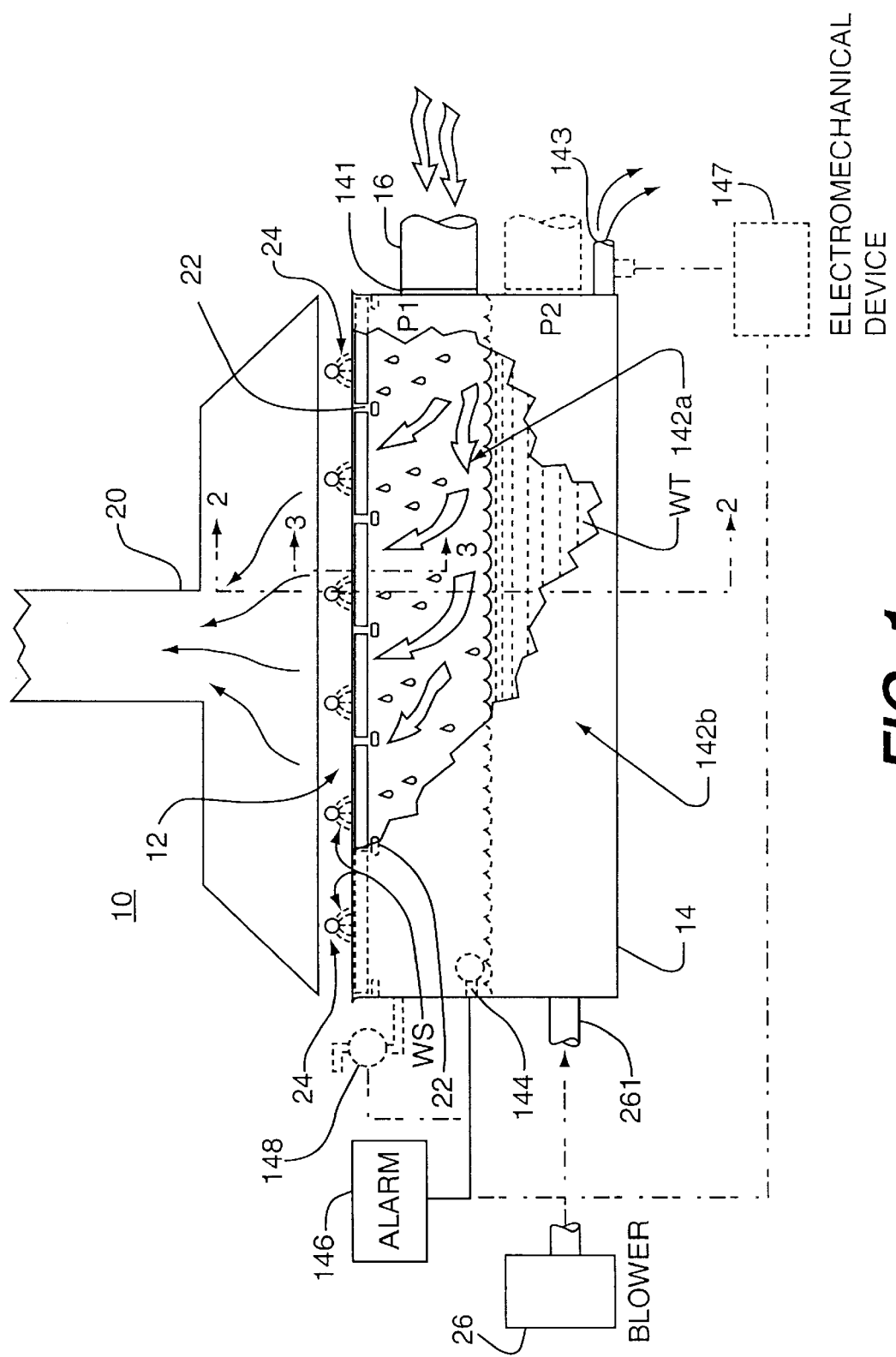
FIG. 1 is a side overall view and partial cutaway view of a first embodiment of the present invention.

With reference to the figures, like reference characters will be used to indicate like elements throughout the several embodiments and views thereof. In particular, with reference to FIGS. 1 and 2, the present invention is directed to a system 10 that is composed of a filter structure positioned on the open top portion of a reservoir 14, and an input conduit 16 connected to an input port 141 of the reservoir. Depending upon the specific application of the system 10, an output conduit or device 20 may be included through which gaseous or vapor by-products produced by the microbial degradation of the inputted hazardous vapors or fluids are released.

Figure 3:
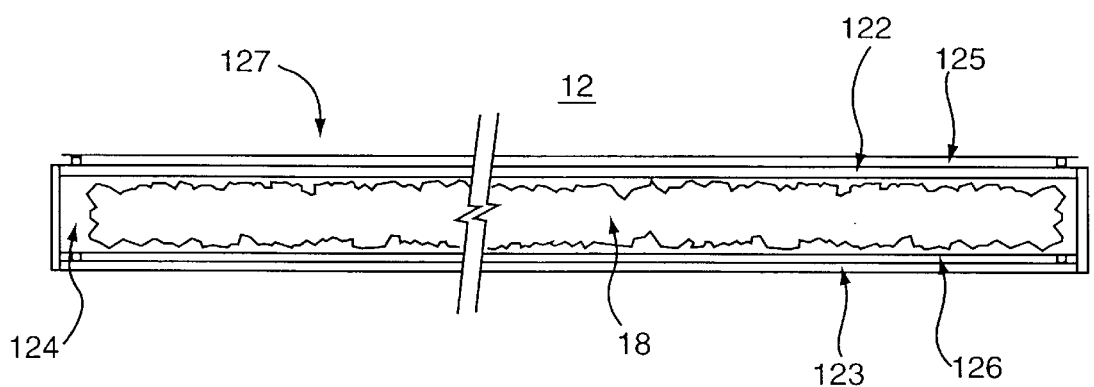
FIG. 3 is a detailed cross-sectional view along section line 3—3 shown in FIG. 1 of the filter structure of the present invention.

As shown in FIG. 3, the filter structure 12 incorporates an upper screen plates 122 and a lower screen plate 123 that are positioned parallel one above the another and fixedly separated from each other by a conventional mounting structure, whereby the upper and lower screen plates define an enclosed space 124 between them. In addition, both screen plates 122, 123 include filter sheets 125, 126, respectively, that are positioned on top of the upper surface of their corresponding screen plates.

The enclosed space 124 is filled with a capture or filtering media 18, such as carbon, granulated activated carbon, zeolite or other equivalent materials that can absorb HAPs/VOCs. The dimensions of the reservoir 14, the filter structure 12 and the amount of capture media used will vary depending upon the specific application of the system 10. For example, when used in the recovery of hazardous vapors generated in the wood furniture lacquering/finishing industry, the system will incorporate a reservoir 14 that is 20.0 ft. long, 10.0 ft. wide and 8.0 ft. high, whereby the total surface area of the filter structure 12 will be 200.0 sq. ft. with a 18.0 in. separation between the upper and lower screen plates 122, 123. In this application, approximately 300 cu. ft. of capture media will be cached in the enclosed space 124.

The filter sheets 125, 126 as mentioned above, are used to prevent the capture media from falling out of the enclosed space 124 through the screen plates 122, 123. As such, the material for the filter sheets 125, 126 is selected so as to have a porosity high enough to allow through the flow of water mixed with HAP/VOC contaminants, but sufficiently low to trap the capture media and thereby prevent the capture media from deteriorating. The filter sheets 125, 126 may be formed using cloth, fabric, woven metal or other porous media. Insofar as a cloth or fabric material, the filter sheets may be formed from nylon, woven fibreglass or other similar materials. If a woven metal is used to implement the filter sheets, one example for the material is steel mesh.

Figure 2:
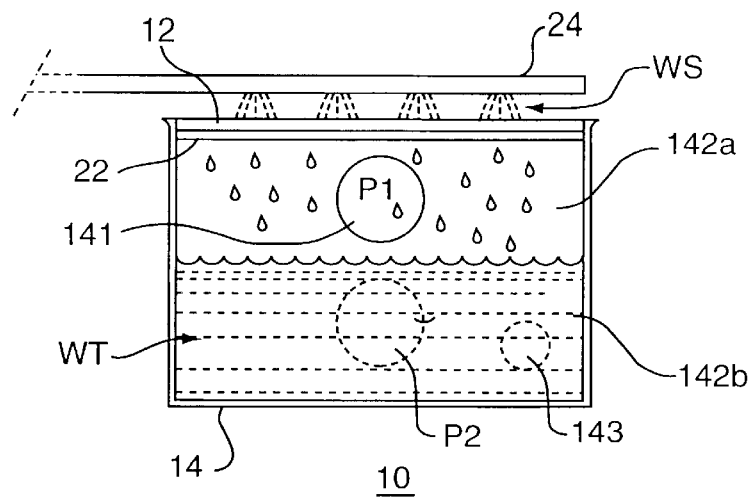
FIG. 2 is a front cross-sectional and partial cutaway view along section line 2—2 shown in FIG. 1 of the first embodiment of the present invention.

As shown in FIG. 1, above the filter structure 12, a plurality of sprinkler heads 24 are fixedly positioned, whereby a sprayed water bath WS or other sprayed washing solution from the sprinkler heads 24 is sprayed substantially over the entire surface area of the filter structure 12.

Also as shown in the drawings, the reservoir 14 is essentially a square or rectangular box-shaped enclosure with an open top end covered by the filter structure 12. The input port 141 of the reservoir 14 is positioned at one end, whereby inputted hazardous vapors or fluids, such as in an air stream, entering through the input conduit 16 will flow into the reservoir 14 and upward through the filter structure 12. The input port 141 may, however, be positioned in alternate locations on the outer surface of the reservoir 14 in order to accommodate the flow characteristics of the inputted vapor or fluid or to accommodate any space or positioning requirements of the system's application.

A lower tank portion 142b of the reservoir 14 is formed to act as a tank water bath WT for the inputted vapor or fluid. The tank water bath WT is composed of water inoculated with AGRIMICROBE SALES FORMULA V™ (a mixture of 18 naturally occurring microbes available from AgriMicrobe Sales, Broadnax, Va.) microbes. The amount of microbes put into the water and maintained thereafter is generally set at a level consistent with levels that can discharged into a city sewer system or a septic tank system, or can be sprayed onto the ground.

As shown in FIG. 1, the input port 141 may be connected so as to feed into an upper tank portion 142a of the reservoir 14 above the surface of the water bath WT at P1, or submerged into the lower tank portion 142b at P2. If the input port 141 is connected above the surface of the tank water bath WT, the inputted vapor or fluid can flow over the tank water bath WT and react with microorganisms on the top surface of the tank water bath. The remainder of the inputted vapor or fluid would flow up to the filter structure 12 where the sprayed water bath WS from the sprinkler heads 24 would be used to react with contaminants caught in the filter structure 12. This variation for connecting the input port 141 would be applicable to situations where only ambient or low velocity/pressure flow of the inputted vapor or fluid was used to bring the vapor or fluid into the reservoir 14.

Alternatively, if the connection of the input port 141 is submerged into the lower tank portion 142b, the inputted vapor or fluid will flow through the tank water bath WT, whereby the microorganisms in the tank water bath can react with the inputted vapor or fluid. Any inputted vapor or fluid that escapes out of the tank water bath WT will then flow up to the filter structure 12 where the sprayed water bath WS from the sprinkler heads 24 would be used to react with contaminants caught in the filter structure 12. This second variation for connecting the input port 141 would be applicable to situations where the inputted vapor or fluid is pumped, forced or otherwise flowing at a high velocity/pressure into the reservoir 14.

To keep the microorganisms in the tank water bath WT supplied with oxygen, a blower 26 is integrally formed into the system, wherein air is pumped by the blower 26 through a conduit 261 into the lower portion of the reservoir 14 through a coupling 145. The structure and operation of the blower 26 are consistent with those of similar devices known in the art for replenishing the oxygen or other contents of a fluid.

The reservoir 14 is further equipped with a drain valve 143 located on or near its bottom surface in order to drain or circulate the water of the tank water bath WT in the lower tank portion 142b during operation. Also, a water level sensor 144 is connected in the interior of the reservoir 14 in order to monitor for the level of the tank water bath in the lower tank portion 142b. This allows a user to determine when additional water is needed, or when the drain valve 143 needs to be opened for draining. For example, the water level sensor 144 may be connected to a visual or audible alarm 146 that then signals the user that the tank water bath may be too high or too low.

Alternatively, instead of using the water level sensor 144 to simply trigger an alarm 146, the water level sensor may be connected to an electromechanical device 147, such as a solenoid, that would use a signal from the water level sensor 144 to energize and thereby automatically open the drain valve 143 when the tank water bath needs to be circulated or simply emptied out. If the water level sensor 144 were to detect that the tank water bath level was too low, a water supply input valve 148 could be installed to automatically provide more water for the tank water bath WT.

The components of the filter structure 12 and the reservoir 14 may be constructed from materials known in the art that are capable of supporting the structural loads applied to them, and of not deteriorating with exposure to water, the contaminants to be processed, microbiological growths and the products of microbiological reactions. Such materials include but are not limited to stainless steel, PVC, reinforced fiberglass, painted carbon steel and coated carbon steel. The upper and lower screen plates 122, 123 may be formed using, among other example materials, reinforced fiberglass, painted carbon steel and coated carbon steel.

In the implementation of the filter structure 12, as illustrated in FIG. 1, the filter structure may consist of a plurality of filter elements 127 that are mounted on mounting elements 22 built into the top portion of the reservoir 14. each filter element 127 would incorporate upper and lower screen plates 122, 123, filter sheets 125, 126 and capture media 18 in the enclosed space 124. This implementation allows a user to change, clean or otherwise service the filter structure one element at a time, without having to lift or remove the entire filter structure 12 from the reservoir 14. The size and number of separate filter elements 127 will vary depending on the particular application of the system, and on the available size of the reservoir 14. Alternatively, the filter structure 12 may be implemented as a single integrally formed unit that spans the entire top portion of the reservoir 14 (not shown).

The sprinkler heads 24 may be implemented using conventional industrial sprinklers, such as standard 5 foot radius spray heads, or other similar devices for spraying fluids over a specified area. Similarly, the water level sensor 144 and the drain valve 143 may be implemented using conventional devices. For example, a float switch such as that sold by Grainger Division of W.W. Grainger may be used to implement the water level sensor 144, while a conventional gate valve may be used for the drain valve 143.

The structure of the top portion of the reservoir 14, in at least the first embodiment, is formed to be open with the filter structure 12 enclosing it, whereby any vapor output of the system 10 may be drawn out and away from the system 10 through the filter structure 12 and into an output conduit or device 20. Different embodiments of the present invention may implement the output conduit or device 20 in different ways as would be known in the art, such as an open or an enclosed hood that is fixedly connected to the open upper portion of the reservoir 14 as shown in FIG. 1.

In operation, the inputted vapors or fluid is fed through the input conduit 16 and into the input port 141 of the reservoir 14. After initially reacting with the tank water bath WT in the reservoir, the remaining vapor or fluid then flows upward and through the filter structure 12 and filters through the capture media 18. The capture media 18 traps the contaminants in the vapor or fluid. Periodically, the sprinkler heads will spray the filter structure 12 with the sprayed water bath WS. The contaminants are then leached out of the capture media 18 and down into the tank water bath WT, wherein the microorganisms in the tank water bath will further break down the contaminants into harmless by-products such as carbon, carbon dioxide, water and fatty acid. Any other gaseous or vaporous by-products are then released or drawn through the top open portion of the reservoir 14, and again through the filter structure 12, along with any excess air or oxygen pumped into the reservoir 14 from the blower 26. At the same time, the excess of the sprayed water bath WS will flow down into and collect in the reservoir 14. When the level of the tank water bath WT with the excess sprayed water bath from the sprinkler heads 24 reaches a predetermined level in the reservoir 14, the water level sensor 144 will signal the presence of that amount of water, whereby the drain valve 143 may be opened to partially or fully empty the reservoir 14.

Like the tank water bath WT, the sprayed water bath WS is composed of water inoculated with AGRIMICROBE Formula V™ microbes. The amount of microbes put into the sprayed water bath and maintained thereafter is also set at a level consistent with levels that can be discharged into a city sewer system or a septic tank system, or can be sprayed onto the ground. In connection with the above-mentioned application, for example, the water bath may be impregnated so as to have a concentration of several 100 billion of AGIRMICROBE Formula V. Such a concentration of microbe-impregnated water is sufficient to remove contaminants such as toluene, xylene and styrene caught in the filter structure 12.

The use of AGRIMICROBE Formula V was selected based on the fact that this particular formulation of naturally-occurring microorganisms have an affinity for oil both biochemically and physically, wherein the microbes have been shown to effectively recycle a wide range of organic waste materials by converting them into non-toxic components. In addition, that formula has the advantages of being formed as a dry, powder material with a 5-year shelf life, being usable in either fresh or salt water, having a high concentration of 100 billion cells per gram, and being non-toxic itself. The formula is composed of a microorganism mixture of single cell bacteria and enzymes ranging in size from 1 to 10 microns, with a pH range of 5.50 to 10.00 and a temperature tolerance of 35 to 120° F. The microorganisms are aerobic, meaning that they require oxygen to operate.

The present invention may use other microbe formulas that can achieve bioremediation and that have characteristics similar to the AGRIMICROBE FORMULA V™ discuses above. Such other microbe formulas should be selected so as to be capable of bioremediation of materials such as:

| | |
|---|---|
| Acenaphthene | Methylene Chloride |
| Acrolein | Monoalkylbenzenes |
| Acrylonitrile | Motor Oils |
| Alkylamine Oxides | Napthulene |
| Aromatics | Nitrated Phenols |
| Benzene | Oil Base Paints |
| Biphenyl | Oil Base Fluids |
| Brake Fluid | Oil Base Ink |
| Branched Hydrocarbons | Organic Herbicides |
| Chlorinated Phenols | Organic Pesticides |
| Chloro Naphthalene | Pentane |
| Chlorobenzene | Phenoxyacetates |
| Chloroform | Phenylureas |
| Crude Oils | Phthalate Esters |
| Cyanide | Polycyclic Aromatics |
| Cutting Oils | Pulp By-Products |
| Dichlorobenzene | Secondary Alkylbenzene |
| Diesel Fuels | Sodium Methyl Sulfate |
| Diethyleneglycol | Sulfur |
| Ethylbenzene | Toluene |
| Fluoanthene | Trichloroethylene |
| Fuel Oils #1–6 | Varsol |
| Gasoline | Vegetable Oils |
| Grease | Xylene |
| Halogenated Hydrocarbons | |
| Heating Oils | |
| Heptane | |
| Hexane | |
| Isoprene | |
| Hydraulic Fluids | |
| Hydrocarbons | |
| Jet Fuels | |
| Kerosene | |
| Long Chained Alkenes | |
| Lubricating Oils | |
| Marine Fuels | |
| Mercaptan | |

Figure 4:
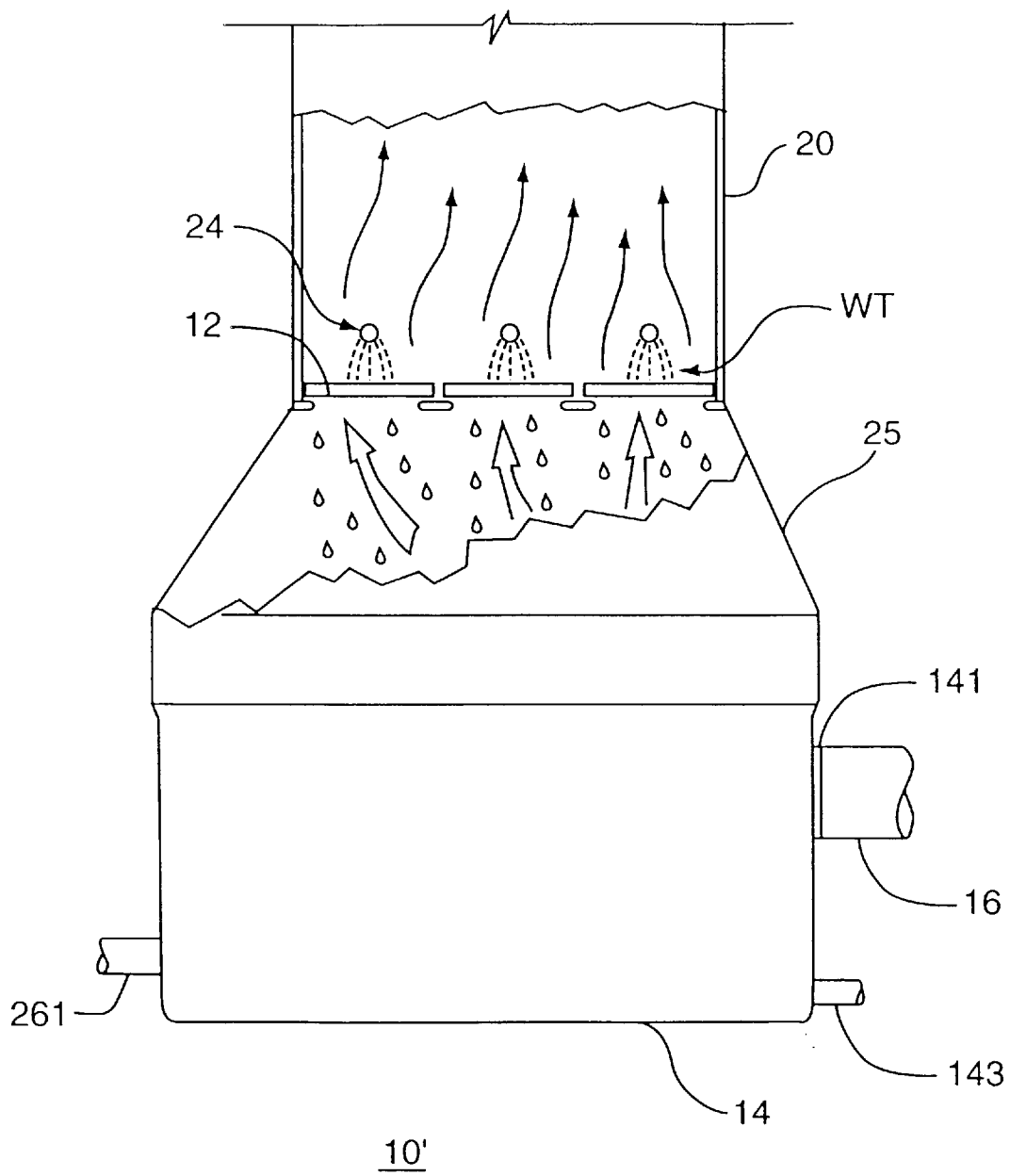
FIG. 4 is a side overall and partial cutaway view of a second embodiment of the present invention.

In a second embodiment of the present invention, as shown in FIG. 4, the filter structure 12 may be located remotely from the reservoir 14. Otherwise, all other components and their arrangements are the same as those of the first embodiment. In this second embodiment of the system 10', the filter structure 12 is positioned at the input of the output conduit 20 with a connecting conduit 25 positioned between the filter structure 12 and the top portion of the reservoir 14. The sprinkler heads 24 are positioned above the filter structure 12 within the output conduit 20. The shape and dimensions of the connecting conduit 25 will vary depending on the specific application for the system and on the relative position of the reservoir 14 (e.g., based on space availability) to the portion of the output conduit 20 that can accommodate the filter structure 12 and the sprinkler heads 24.

In operation, vapor or fluid flowing from the reservoir 14 will flow through the connecting conduit 25 to the filter structure 12. Excess of the sprayed water bath WT coming through the filter structure 12 will flow down the connecting conduit 25 to the reservoir 14.

This second embodiment is useful in adapting the system 10' of the present invention to conventional hazardous vapor recovery systems currently in use by, for example, the furniture industry. In such conventional systems, the contaminated vapor or fluid is simply inputted into an untreated water bath, whereby only a portion of the contaminants are dissolved into the water for later removal. Any remaining gaseous or vapor contaminants are simply outputted through an output conduit or vent to the open atmosphere. Using the second embodiment of the present invention, the reservoir 14 with its tank water bath WT would replace the untreated water bath, while the filter structure 12 and sprinkler heads 24 would be incorporated into the output conduit. A connecting conduit would then be added or at least modified to accordingly connect the filter structure 12 with the reservoir 14, whereby the flow of contaminated vapor to the filter structure 12 and of excess sprayed water bath down to the reservoir 14 could be implemented.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A system for recovering and recycling HAP/VOC contaminants from a contaminated air stream using bioremediation, comprising:

a reservoir having a lower tank portion in which a first water bath is maintained;

a filter structure containing a capture material therein, said filter structure being fixedly mounted over a top portion of said reservoir; and means for spraying a second water bath over said filter structure;

wherein said first and second water baths are composed of microbe-inoculated volumes of water, said volumes of water being inoculated with a predetermined type of microorganisms having an affinity for the contaminants to be processed, and wherein said reservoir, said filter structure and said spraying means are positioned relative to one another whereby the contaminated air stream flows into said reservoir and a portion of the contaminants are leached into said first water bath in the lower tank portion, the remaining contaminants are filtered through said filter structure and are captured in the filter structure, after which said second water bath is sprayed from said spraying means down through said filter structure to leach the captured contaminants and direct said leached contaminants to said first water bath.

2. A system according to claim 1, wherein said capture material is selected from at least one of carbon, activated granular carbon and zeolite.

3. A system according to claim 1, wherein said predetermined type of microorganisms is AGRIMICROBE SALES FORMULA V™, a mixture of 18 naturally occurring microbes.

4. A system according to claim 1, wherein said reservoir further includes an input conduit through which the contaminated air stream is inputted into said reservoir.

5. A system according to claim 4, wherein said input conduit is connected to said reservoir so as to input the contaminated air stream above a top surface level of said first water bath.

6. A system according to claim 4, wherein said input conduit is connected to said reservoir so as to input the contaminated air stream below a top surface level of said first water bath.

7. A system according to claim 1, wherein said reservoir includes a water level sensor for monitoring a level of said first water bath in said reservoir.

8. A method for recovering and recycling HAPs/VOCs from an air stream using bioremediation, said method comprising the steps of:

providing a filter structure containing a capture material therein;

providing a first microbe-inoculated water bath so as to position said filter structure over said first water bath;

inputting an HAP/VOC-contaminated air stream into said reservoir, whereby HAPs/VOCs are initially leached into the first microbe-inoculated water bath and thereby bioremediated therewith;

filtering remaining HAPs/VOCs in the air stream through the filter structure; and spraying said filter structure with a second microbe-inoculated water bath so as to further leach the HAPs/VOCs out of the filter structure and into the second water bath, whereby the second water bath will flow through the filter structure and into the first water bath, thereby further bioremediating the remaining HAPs/VOCs.

9. A method according to claim 8, further comprising the step of:

selecting said capture material from at least one of carbon, activated granular carbon and zeolite.

10. A method according to claim 8, further comprising the step of:

preparing the first and second microbe-inoculated water baths by introducing a predetermined type of microorganisms having an affinity for the HAPs/VOCs to be processed into the first and second water baths.

11. A method according to claim 10, wherein said step of preparing the first and second microbe-inoculated water baths includes selecting AGRIMICROBE SALES FORMULA V™, a mixture of 18 naturally occurring microbes, as the predetermined type of microorganisms.

12. A method according to claim 10, wherein said step of inputting the HAP/VOC-contaminated air stream into said reservoir includes inputting the HAP/VOC-contaminated air stream above a top surface level of the first microbe-inoculated water bath.

13. A method according to claim 10, wherein said step of inputting the HAP/VOC-contaminated air stream into said reservoir includes inputting the HAP/VOC-contaminated air stream below a top surface level of the first microbe-inoculated water bath.

* * * * *